United States Patent
Haughton et al.

(10) Patent No.: US 6,599,065 B2
(45) Date of Patent: Jul. 29, 2003

(54) TAPERED PLUG CUTTER

(75) Inventors: Keith Louis Haughton, Midland (CA); Glenn Wallace Haughton, Toronto (CA)

(73) Assignee: Mibro Partners, Scarborough (CA)

( * ) Notice: Subject to any disclaimer, the term of this patent is extended or adjusted under 35 U.S.C. 154(b) by 0 days.

(21) Appl. No.: 09/925,725

(22) Filed: Aug. 10, 2001

(65) Prior Publication Data

US 2003/0031521 A1 Feb. 13, 2003

(51) Int. Cl.<sup>7</sup> ............................................... B23B 51/04
(52) U.S. Cl. ..................... 408/203.5; 408/204
(58) Field of Search ............... 408/203.5, 204, 408/206, 207, 224, 223, 703

(56) References Cited

U.S. PATENT DOCUMENTS

| | | | | |
|---|---|---|---|---|
| 53,722 A | * | 4/1866 | Wyckoff | 408/204 |
| 313,405 A | * | 3/1885 | Davis | 408/59 |
| 2,779,361 A | * | 1/1957 | McKiff | 408/204 |
| 3,086,410 A | * | 4/1963 | Zimmerman | 408/204 |
| 3,130,763 A | * | 4/1964 | Schlosser et al. | 408/205 |
| 3,227,013 A | * | 1/1966 | Zimmerman | 408/204 |
| 3,244,035 A | * | 4/1966 | Jehle et al. | 408/204 |
| 3,548,687 A | * | 12/1970 | Holloway | 408/206 |
| 4,129,401 A | * | 12/1978 | Berthier | 408/59 |
| 4,297,059 A | * | 10/1981 | Miyanaga | 408/202 |
| 4,966,502 A | * | 10/1990 | Magyari | 408/59 |
| 5,205,685 A | * | 4/1993 | Herbert | 408/204 |
| 5,213,456 A | | 5/1993 | Lee | |
| 5,401,125 A | | 3/1995 | Sevack et al. | |
| 5,810,524 A | | 9/1998 | Wirth, Jr. et al. | |
| 6,123,490 A | * | 9/2000 | Underhill | 408/204 |

FOREIGN PATENT DOCUMENTS

| | | | | |
|---|---|---|---|---|
| DE | 2410120 A | * | 9/1975 | 408/206 |
| DE | 3240163 A | * | 5/1984 | 480/204 |
| DE | 263477 A | * | 1/1989 | 408/204 |
| DE | 280057 A | * | 6/1990 | 408/204 |
| EP | 458047 A | * | 11/1991 | 408/206 |
| JP | 14287 A | * | 2/1977 | 408/206 |
| SU | 369980 | * | 4/1973 | 408/206 |

* cited by examiner

Primary Examiner—Daniel W. Howell
(74) Attorney, Agent, or Firm—Nancy E. Hill; Hill & Schumacher

(57) ABSTRACT

A plug cutter is for use in association with a drill, drill press and the like and is for producing a plug. The plug cutter includes a shank, a body portion, an outside cutter and an inside cutter. The shank has a longitudinal axis and is adapted to engage the drill. The body portion is integrally attached to the shank and extends downwardly therefrom. The outside cutter extends downwardly from the body portion and the inside cutter extends downwardly from the body portion and is spaced from the outside cutter. The outside cutter may have an outside cutting edge with a positive rake. The inside cutter may have an inside cutting edge with a positive rake.

15 Claims, 3 Drawing Sheets

TAPERED PLUG CUTTER

FIELD OF THE INVENTION

This invention relates to wood working tools and in particular to tapered plug cutters used to produce wooden plugs.

BACKGROUND OF THE INVENTION

Wooden plugs are often used to fill round holes in a workpiece to conceal fasteners and screws that have been set below the surface of a workpiece. Generally an overly long wooden plug is applied and glued into the hole to be filled and has its excess trimmed to the surrounding surface height and sanded smooth. Ordinary wooden dowels have been used for this purpose in the past, but as dowels are made with their axis parallel to the grain of the wood and as the end grain of wood accepts stains and finishes differently than the face grain of a piece of wood, it is desirable that plugs be made with their axis at right angle to the grain. When plugs of this type are used, staining and finishing of a workpiece can be achieved with the plugs being almost invisible. Further regarding the staining and finishing of wood, different woods accept stains differently, so it is often desirable that plugs for a workpiece be made from the same wood, or even the same piece of wood, as the workpiece. That being the case, it is desirable that a woodworker have the option of manufacturing their own plugs, and so numerous plug cutters have thus been introduced to provide woodworkers with that option.

There are plug cutters are used to produce cylindrical plugs. However a cylindrical plug may result in a gap or a circle of glue between the workpiece and the plug. Accordingly tapered plug cutters have been developed which produce tapered plugs. Tapered plugs are more likely to fit snugly into their holes, to limit the gap around and to provide a good appearance.

Some woodworkers have noticed that while tapered plugs improve the fit in holes, they also have the tendency to tip sideways during insertion and so compromise their placement in a workpiece. To limit the amount of movement that occurs when a plug is inserted, some woodworkers prefer to have both a tapered portion, to maintain the tight fit, and a cylindrical portion, to limit the movement during insertion. The cylindrical portion is at the minor diameter end of the tapered portion of the plug. By having the cylindrical portion at the minor diameter end, the cylindrical portion limits the amount of movement the plug can experience when inserted and so keeps the plug correctly oriented. Preferably the cylindrical portion of the plug is of a diameter the same as or very slightly less than the hole to be filled, to gain the greatest movement limiting effect while still fitting in the hole.

The cutting characteristics of plug cutters depends on the geometry of the cutting edges of the cutter. It is common to find plug cutters that have a plurality of cutting edges that extend generally radially from the axis of the cutter. This arrangement yields edges that cut the wood with a scrapping action. Alternatively, the cutting edges can be tilted backward from the direction of rotation so as to provide some positive rake to the edge, and so improve the cutting characteristics of the cutter.

During the operation of a plug cutter, it is recommended that the work be conducted in a drill press, as opposed to a hand held drill, as the forces on the cutter tend to cause considerable wandering tendencies. This wandering tendency is greatest while starting to cut a plug and decreases when the cutter has moved into the stock, but is substantial enough that use of the cutter in a hand held drill is difficult. The larger the diameter of the formed plug, the more pronounced the wandering tendencies and so the more difficult and dangerous the exercise becomes. The use of a drilling guide, to align and steady the cutter, can make hand forming of plugs possible, but the process is slowed down as the guide has to be clamped to the stock and moved for each plug that is formed.

Once the plug has been formed in the stock, it is detached either by prying and snapping it from the stock, for example with a screwdriver, or by cutting it from the stock with a saw, by cutting across the lower portion of the plug.

Several plug cutters have been developed to manufacture tapered plugs with cylindrical portions. U.S. Pat. No. 5,213,456 issued to Lee on May 25, 1993 shows a cutter that will form a tapered plug having a cylindrical portion at the minor diameter end of the tapered portion. Similarly, U.S. Pat. No. 5,401,125 issued to Sevack et al. on Mar. 28, 1995 shows a cutter that forms plugs having a cylindrical portion at the minor diameter end of a generally flared body portion, the flared body portion providing improved fit and alignment during insertion over cylindrical and tapered plug performance. Additionally, the Sevack cutter shows a hole through the shank that may be used to eject plugs that have sheared off from the stock during forming of the plug, allowing for improved removal of sheared plugs. U.S. Pat. No. 5,810,524 issued to Wirth et al. on Sep. 22, 1998 shows a cutter that has clearance applied to the inner surfaces of its cutting edges to minimize the contact between the cutter and the plug.

Despite these and many other improvements to plug cutters there still remain deficiencies and it is the ambition of this invention to overcome these deficiencies. In particular it would be advantageous to have a plug cutter that forms tapered plugs, having a cylindrical portion, that has good cutting characteristics, increased clearance between the cutter and the formed plug and increased ease of removing a sheared plug from the cutter.

SUMMARY OF THE INVENTION

The present invention is a plug cutter for use in association with a drill, drill press and the like and is for producing a plug. The plug cutter includes a shank, a body portion, an outside cutter and an inside cutter. The shank has a longitudinal axis and is adapted to engage the drill. The body portion is integrally attached to the shank and extends downwardly therefrom. The outside cutter extends downwardly from the body portion and the inside cutter extends downwardly from the body portion and is spaced from the outside cutter. The outside cutter may have an outside cutting edge with a positive rake. The inside cutter may have an inside cutting edge with a positive rake.

In another aspect of the invention a plug cutter is for use in association with a drill, drill press and the like and is for producing a plug. The plug cutter includes a shank, a body portion, a plurality of blades and a shoulder. The shank has a longitudinal axis and is adapted to engage the drill. The body portion is integrally attached to the shank and extends downwardly therefrom. The plurality of cutting blades extend downwardly from the body portion and are adapted to cut a plug. The shoulder extends outwardly from the body portion and is adapted to limit movement of the plug cutter into a workpiece.

In a further aspect of the invention a plug cutter is for use in association with a drill, drill press and the like and is for producing a plug. The plug cutter includes a shank, a body portion, a plurality of blades and a cavity. The shank has a longitudinal axis and is adapted to engage the drill. The body portion is integrally attached to the shank and extends downwardly therefrom. The plurality of cutting blades extend downwardly from the body portion and are adapted to cut a plug. The cavity is formed in the body portion to provide access to a top of a plug.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

Figure 1:
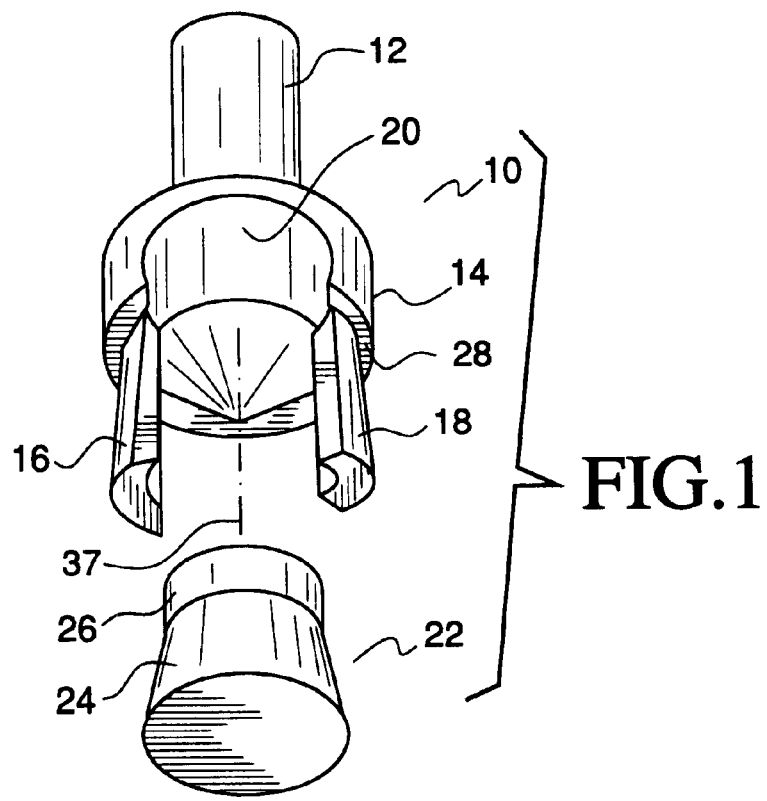
FIG. 1 is a perspective view of the tapered plug cutter constructed in accordance with the present invention, shown with a plug.

The plug cutter of the present invention is a cutter for forming tapered plugs in a wooden work piece. The cutter 10 is shown in FIG. 1 and has a shank 12, a body portion 14, an outside cutter 16, inside cutter 18 and a clearance cavity 20. The tapered plug 22, also shown in FIG. 1, formed by the cutter 10 has a tapered portion 24 and a cylindrical portion 26, such that the cylindrical portion 26 is at the minor diameter end of the tapered portion 24. A shoulder 28 extends around the perimeter of the cutter 10 between the body portion 14 and the cutters 16 and 18. The shoulder 28 extends radially beyond the outer limits of both the outside cutter 16 and the inside cutter 18 such that it acts like a depth stop during operation of the cutter 10.

Figure 7:
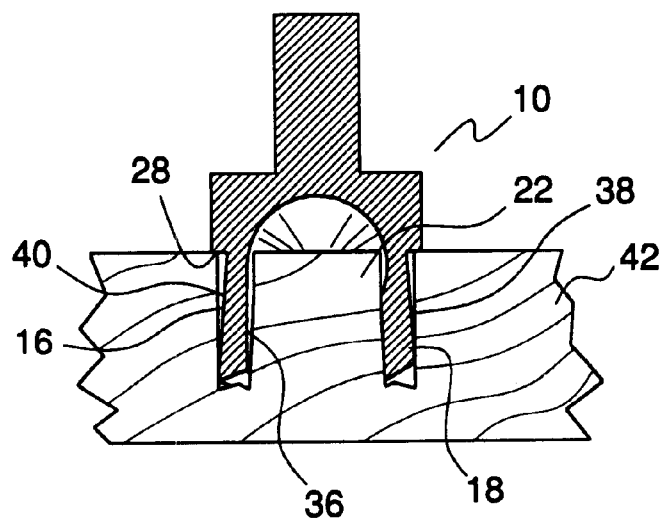
FIG. 7 is a side view of the tapered plug cutter engaged in a work piece at full depth of cut, the cutter and the work piece shown in section.
Figure 2:
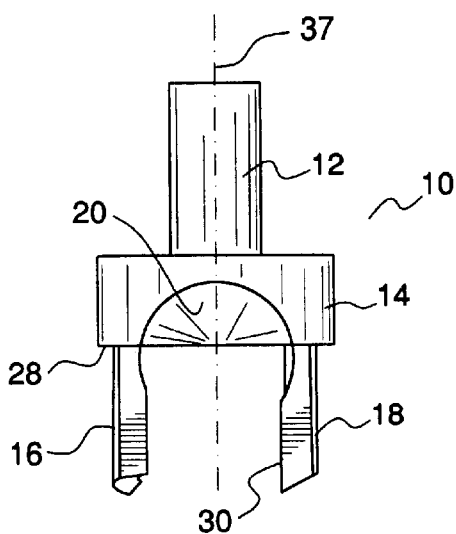
FIG. 2 is a front view of the tapered plug cutter of FIG. 1.
Figure 3:
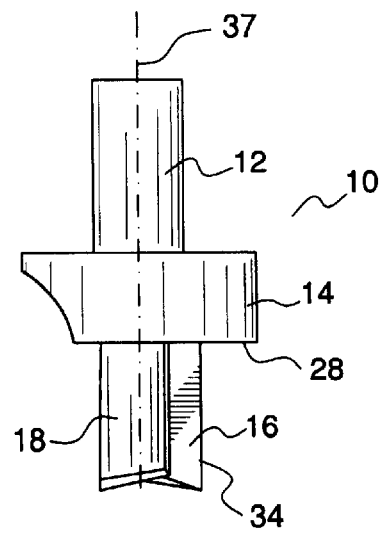
FIG. 3 is a first side view of the tapered plug cutter of FIG. 1.
Figure 4:
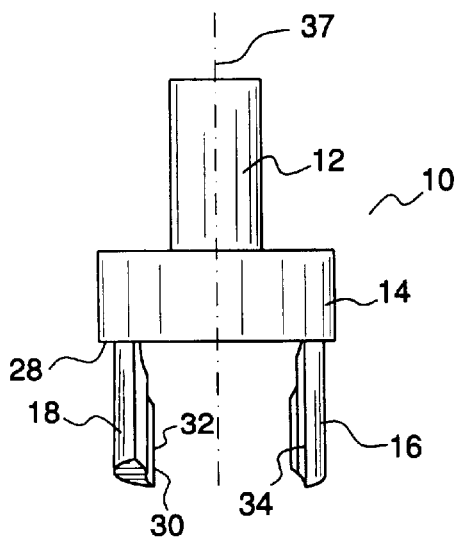
FIG. 4 is a back view of the tapered plug cutter of FIG. 1.
Figure 5:
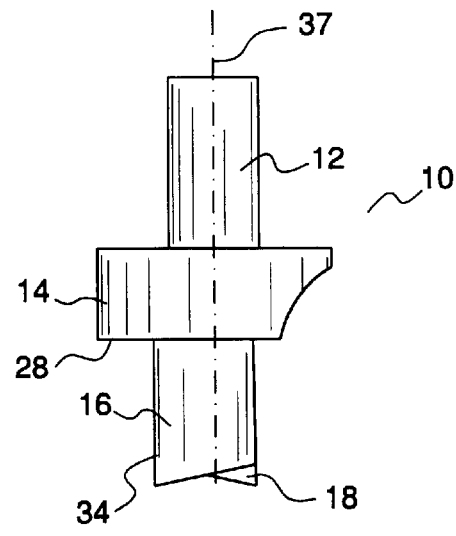
FIG. 5 is a second side view of the tapered plug cutter of FIG. 1.
Figure 6:
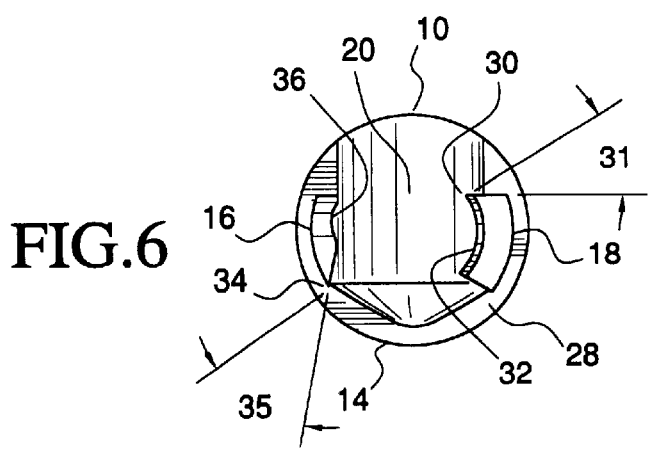
FIG. 6 is an end view of the tapered plug cutter of FIG. 1.

Shown in FIGS. 2 to 5 are the four sides of the cutter 10 and shown in FIG. 6 is an end view of the cutter 10. In these figures, the inside cutting edge 30 of the inside cutter 18 is shown to be tapered, and it is this cutting edge that forms the tapered portion 24 of the plug 22. Further, the inside surface 32 of the inside cutter 18 also is a tapered surface that contacts the plug 22 when forming the plug 22. Additionally, the outside cutting edge 34 of the outside cutter 16 is shown to be tapered. It is the outside cutting edge 34 that cuts the outer boundary of the annular groove formed when cutting a plug 22. The inside surface 36 of the outside cutter 16 establishes a surface that is at a radius from the longitudinal axis 37 greater than any portion of the inside cutting edge 30. Preferably, no part of the inside surface 36 of the outside cutter 16 contacts the plug 22 during formation of a plug 22. FIG. 7, showing a section through both the cutter 10 and the work piece 42, shows the clearance between the plug 22 and the inside surface 36 of the outside cutter 16. Also shown in that figure is the clearance established between work piece 42 and the outer surfaces 38 and 40 of the inside cutter 18 and the outside cutter 16 respectively.

Preferably, the tips of the cutters 16 and 18 have bevelled ends where, although it is shown in the figures that the outside cutter 16 end is sloped away from the longitudinal axis 37 and the inside cutter 18 end is sloped toward the longitudinal axis 37, it is recognized that as long as one of the cutters has an end that is sloped toward the longitudinal axis 37, satisfactory plug 22 formation will occur. The provision that at least one of the ends be sloped toward the longitudinal axis 37 establishes a stress concentration when plug 22 is removed from the work piece by outward prying as with a screw driver.

Additionally FIG. 7 shows a formed plug 22 that has a tapered portion 24 and a cylindrical portion 26. The plug 22 has not been detached from the work piece but the cutter 10 is shown at its finished depth of cut. The finished depth of cut is determined when the shoulder 28 engages the upper surface of the work piece 42 and so limits further cutting and downward movement of the cutter 10.

The location and diameter of the clearance cavity 20 determines the upper limit of the inside cutting edge 30 and that determines the proportion of the plug 22 that it tapered 24 versus cylindrical 26. Additionally, the location of the shoulder 28 in relation to the clearance cavity 20 and the inside cutting edge 30 determines where the cutting action stops and thus determines the proportion of tapered 24 to cylindrical 26 portions of the finished plug 22.

The inside cutting edge 30 and the outside cutting edge 34 are each established to provide a measure of positive rake to the cutting action of each of those cutting edges. The provision of positive rake 31 and 35 to the cutting edges 30 and 34 respectively allows each edge to cut more efficiently or to cut using less torque. As the cutting action to form a tapered plug 22 requires that an entire side of the tapered plug 22 be cut at a time, as opposed to the cutting of an annular groove for the formation of a cylindrical plug, considerable torque must be applied to the cutter 10. Further, as the torque applied to the cutter 10 is the same as the torque that must be resisted by the work piece 42 in order for cutting action to develop, only limited torque can be tolerated by the work piece 42. The cross sectional area at the base of a formed plug 22 is limited by the diameter at the base, so too the torque resisting capacity of the work piece 42 is also limited. Often prior art plug cutters have a plurality of cutters each forming both the tapered portion of the plug and the outer boundary of the annular groove, so that the effective rake angle is zero. Further in use such cutters often shear the plugs at their base during the formation process. This is the case as the work piece can not resist the torque required to cut, so the plugs shears from the work piece. In the case of plug cutters where each individual edge has to perform cutting action on two sides, the plug side and the annular groove side, the rake angles of both edges end up being zero. Any attempt to provide positive rake to one edge causes the other edge to have negative rake, so both edges set at zero rake is often settled for. In an effort to reduce the frequency of sheared plugs, efficient cutting positive rake geometry has been designed into the cutter 10. As the cutter 10 of the present invention has a designated outside cutter 16 and a designated inside cutter 18, there is sufficient opportunity to apply considerable positive rake to each cutter 16 and 18 without compromising the performance of the other.

An additional advantage of the cutter of the present invention over the prior art, is in the provision of the clearance cavity 20. The cavity 20 offers a point of inspection in the instance where a portion of a formed plug has broken off and has jammed between the cutters 16 and 18. As the cavity 20 extends to the perimeter of the cutter 10, it is easy enough to look in the cavity 20 to see if debris is indeed lodged therein. Prior art cutters having the cutting edges surrounding the central bore require that the operator look up the bore for inspection purposes, something that can be trying if the cutter remains in the chuck of a drill press. Similarly, the cavity 20 offers the opportunity to eject sheared plugs from the cutter 10 by means of a screw driver or similar tool. The ejection of sheared plugs being easier when access to the top of the sheared plug is possible as with the cutter of the present invention, as opposed to having to dig the broken plug out as in the case of prior art cutters.

Figure 8:
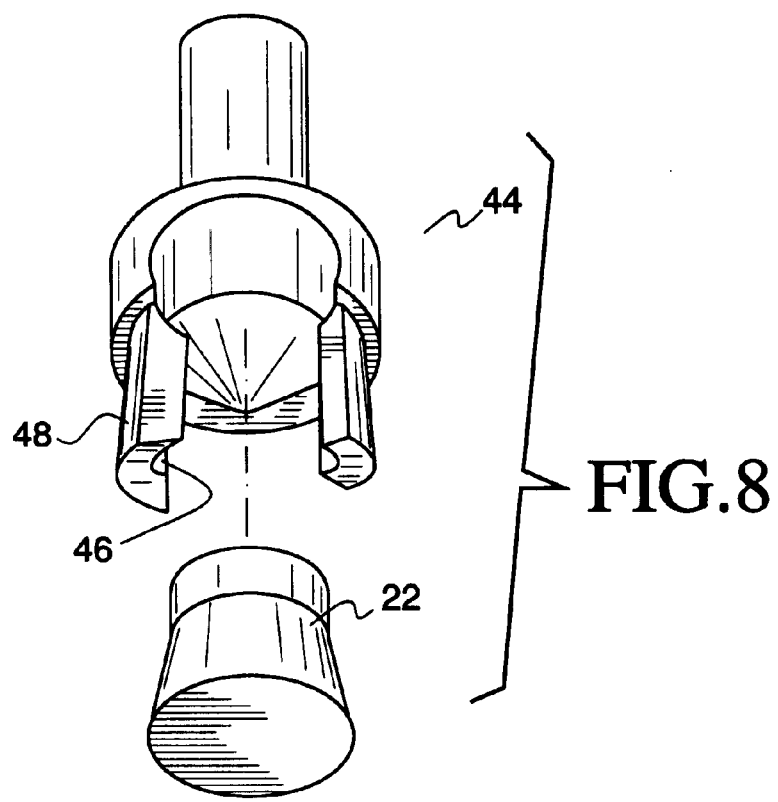
FIG. 8 is perspective view of an alternative embodiment of the tapered plug cutter of the present invention having an outside cutter that contacts the plug at its inside surface.
Figure 9:
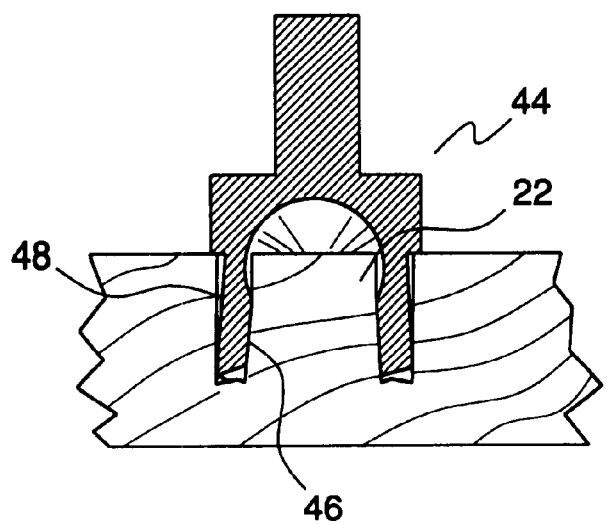
FIG. 9 is the tapered plug cutter of FIG. 8 shown engaged in a work piece at full depth of cut, the cutter and the work piece shown in section.

An alternative embodiment of the plug cutter of the present invention is in the form of a tapered plug cutter 44 shown in FIGS. 8 and 9. In this embodiment of the cutter, a cutter 44 is provided that is similar to the previously disclosed cutter 10 except for the provision of an inside surface 46 to outside cutter 48 that has not been thinned to reduce the amount of contact with the formed plug 22. The advantage obtained for providing an inside surface 46 to outside cutter 48 that engages the plug 22 during formation of the plug 22 is the reduced vibration that may develop. As the forces and amount of contact is equal or balanced on both sides of the formed plug 22 there is reduced likelihood of vibration between the cutter 44 and the plug 22. The advantage of reduced vibration must be weighed against the disadvantage of increased friction and heat build up.

It will be appreciated that the above description relates to the invention by way of example only. Many variations on the invention will be obvious to those skilled in the art and such obvious variations are within the scope of the invention as described herein whether or not expressly described.

What is claimed as the invention is:

1. A plug cutter for use in association with a drill or a drill press for producing a plug comprising:
    a shank having a longitudinal axis adapted to engage the drill;
    a body portion integrally attached to the shank and extending downwardly therefrom;
    an outside cutter extending downwardly from the body portion and having an outside cutting edge with a positive rake; and
    a inside cutter extending downwardly from the body portion, being spaced from the outside cutter and having an inside cutting edge with a positive rake and an inward taper whereby the plug is a tapered plug.

2. A plug cutter as claimed in claim 1 wherein the inside cutting edge has a radius and an inside surface of the outside cutter has a radius that is greater than the radius of the inside cutting edge.

3. A plug cutter as claimed in claim 1 wherein one of the outside cutter and the inside cutter has a bevelled lower end sloped away from the longitudinal axis.

4. A plug cutter as claimed in claim 1 wherein
    a shoulder extends outwardly from the body portion and whereby the shoulder limits movement of the plug cutter into a workpiece.

5. A plug cutter as claimed in claim 1 wherein the inside cutting edge has a body end and a distal end and the body end is spaced from the body portion whereby the plug has a tapered portion and a cylindrical portion.

6. A plug cutter as claimed in claim 5 wherein a shoulder extends outwardly from the body portion and whereby the shoulder limits movement of the plug cutter into a workpiece.

7. A plug cutter as claimed in claim 6 wherein one of the outside cutter and the inside cutter has a bevelled lower end sloped away from the longitudinal axis.

8. A plug cutter as claimed in claim 7 wherein the outside cutter has the bevelled lower end.

9. A plug cutter as claimed in claim 8 further including a clearance cavity formed in the body portion, an upper portion of the outside cutter and an upper portion of the inside cutter.

10. A plug cutter as claimed in claim 9 wherein the outside cutting edge is tapered outwardly from the body portion.

11. A plug cutter as claimed in claim 10 wherein the inside cutting edge has a radius and an inside surface of the outside cutter has a radius that is greater than the radius of the inside cutting edge.

12. A plug cutter as claimed in claim 11 wherein the outside cutting edge has a radius and an outside surface of the inside cutter has a radius that is less than the radius of the outside cutting edge.

13. A plug cutter as claimed in claim 10 wherein the inside cutting edge has a radius and the inside surface of the outside cutter has a radius that is generally the same as the radius of the inside cutting edge.

14. A plug cutter as claimed in claim 13 wherein the outside cutter and the inside cutter extend downwardly from opposed sides of the body portion.

15. A plug cutter as claimed in claim 1 further including a cavity formed in body portion to provide access to a top of a plug.

* * * * *